(12) United States Patent
Timmons

(10) Patent No.: US 11,155,130 B2
(45) Date of Patent: Oct. 26, 2021

(54) TIRE ROTATION DEVICE

(71) Applicant: David Timmons, Jacksonville, FL (US)

(72) Inventor: David Timmons, Jacksonville, FL (US)

(*) Notice: Subject to any disclaimer, the term of this patent is extended or adjusted under 35 U.S.C. 154(b) by 236 days.

(21) Appl. No.: 16/583,586

(22) Filed: Sep. 26, 2019

(65) Prior Publication Data
US 2021/0094368 A1 Apr. 1, 2021

(51) Int. Cl.
*B60C 27/02* (2006.01)
*B60B 15/18* (2006.01)
*B60C 27/04* (2006.01)

(52) U.S. Cl.
CPC .......... *B60C 27/0284* (2013.01); *B60B 15/18* (2013.01); *B60C 27/04* (2013.01); *B60B 2900/551* (2013.01)

(58) Field of Classification Search
CPC ... B60C 27/02; B60C 27/023; B60C 27/0238; B60C 27/0261; B60C 27/0284; B60C 27/04; B60B 15/18
See application file for complete search history.

(56) References Cited

U.S. PATENT DOCUMENTS

| | | | |
|---|---|---|---|
| 2,469,235 A | 5/1949 | Lindenthaler | |
| 2,946,366 A * | 7/1960 | Saperstein | B60C 27/02 152/218 |
| 3,752,204 A | 8/1973 | Oluette | |
| 4,209,049 A | 6/1980 | Regensburger | |
| 4,234,028 A | 11/1980 | Leftault | |
| 4,246,691 A | 1/1981 | Ulmer | |
| 4,287,926 A | 9/1981 | Wong | |
| 4,376,457 A | 3/1983 | Guenther | |
| 4,387,930 A | 6/1983 | Hunt | |
| 4,529,023 A | 7/1985 | Deland | |
| 4,679,608 A | 7/1987 | Jeindl | |
| 4,852,948 A | 8/1989 | Vagias | |
| 5,088,534 A | 2/1992 | Engel | |
| 5,540,267 A | 7/1996 | Rona | |
| 6,341,635 B1 | 1/2002 | Robeson | |
| 6,708,746 B2 * | 3/2004 | Wilkinson | B60C 27/04 152/221 |
| 7,703,492 B2 | 4/2010 | Langue | |
| 8,113,252 B2 | 2/2012 | Reil | |
| 8,651,154 B1 | 2/2014 | Chira | |
| 9,067,463 B2 | 6/2015 | Moses | |
| 9,469,170 B1 | 10/2016 | Tyszkiewicz | |
| 9,840,233 B2 | 12/2017 | Korus | |
| 9,981,511 B2 | 5/2018 | Martin | |
| 10,106,000 B2 * | 10/2018 | Curry | B60C 27/20 |
| 10,124,637 B2 | 11/2018 | Abad | |
| 10,179,486 B2 | 1/2019 | Theroux | |
| 2008/0190531 A1 | 8/2008 | Holeyfield | |
| 2011/0094643 A1 | 4/2011 | Reil | |

FOREIGN PATENT DOCUMENTS

| | | | | |
|---|---|---|---|---|
| EP | 0112611 A2 * | 7/1984 | | B60C 27/04 |
| KR | 101410532 B1 * | 6/2014 | | B60C 27/04 |

* cited by examiner

*Primary Examiner* — Jason R Bellinger
(74) *Attorney, Agent, or Firm* — Lawrence J. Gibney, Jr.

(57) ABSTRACT

The device will be placed on the outside surfaces of the tire of a car or truck in the event that the car or truck is stuck either in sand or other soft surface or pothole. On either end of the device will be a pair of shoes or flat surfaces that will grip the surface as the tire begins to rotate. Once the tire is safely out of the problem area and back on a sold road surface, the device is removed and then stowed. The device can be used on any tire of any type of vehicle.

3 Claims, 4 Drawing Sheets

TIRE ROTATION DEVICE

FIELD OF THE INVENTION

Large trucks that haul large and heavy containers work in areas where the road surfaces are often filled with potholes or soft spots. It is not unusual for a truck of that size to weigh ten tons and the container to weigh an additional twenty tons. If the truck gets stuck, the truck must stop its travel and call a tow truck. This decreases the efficiency of the truck and lowers profit for the trucking company and the truck driver. This is a device that will eliminate the need to call a tow truck with its resultant cost and wait time and allow the truck to once again start moving again.

PRIOR ART REFERENCES

There are many prior references to tire traction devices that allow vehicles to be removed or extricated from holes of soft grounds. Each of the devices work to achieve the same general purpose but none of them have the structure of the current device.

A representative example of this types of device can be found at Reil U.S. Patent Publication 2011/0094643 which is a device that is secured to the center of the wheel and extends outward and attaches to the surface of the tire. While the Reil '643 device will be operational on many different types of tires, it will not function on all tires. Another reference that teaches a tire traction device can be found at Chira, U.S. Pat. No. 8,651,154, which is a device that completely surrounds the tire surface. The Chira device is not meant to be portable.

Other references that teach traction devices can be found at Theroux, U.S. Pat. No. 10,179,486 and Moses U.S. Pat. No. 9,067,46. Both of these devices attach to a portion of the truck tire but do not possess the same structure as the current device.

There are other prior references that teach truck traction devices but none of the prior art has the same structure as the structure of the device in the current application.

The current application the device is meant to be portable and can be quickly mounted onto a tire so that the tire can gain traction when the tire begins to rotate. Once the truck is no longer stuck, the device is removed and stowed. This device is a portable device, which will wrap around the perimeter of the tire in order for the tire to gain traction so the truck or vehicle can move. Once the vehicle has moved a sufficient distance and the truck tire is dislodged and can rotate on the road surface, the user removes the device from the tire and stows it in a convenient compartment.

BRIEF SUMMARY OF THE INVENTION

The device will wrap around the perimeter of a tire. On either ends of the device will be a pair of shoes or flat surfaces. The shoes are an integral part of this device. These shoes or flat surface will rest on the tire surface.

A band will connect the shoes to each other. Attached to the band will be a means to tighten the device. The means to tighten the shoes may be a ratchet device. Regardless of the specific means to tighten the device on the tire, it is the desire of the user to be able to tighten it easily.

There are many ways to tighten the device and no specific means to tighten is being claimed in this application. The device can be put on a single tire or the user may elect to put another device on a tire on the opposite side of the truck to obtain additional traction for the tire as it is dislodged from the imperfect surface.

As the tire rotates and obtains traction on the road surface it will permit the truck to move forward. Once it has been determined that the truck has moved a sufficient distance the user removes the device and stows it in a compartment.

This device is designated or predetermined to be a temporary solution so that the truck or vehicle can move a sufficient distance to allow the truck and any associated load to be able to move freely along the highway.

NUMBERING REFERENCES

1 Tire
5 Device
10 Shoes
11 Rounded surface
12 Non-skid plate
15 Band
20 Means to tighten
30 Rigid member

DETAILED DESCRIPTION OF THE EMBODIMENTS

The device 5 is used as a temporary measure to enable the driver of a vehicle to become dislodged from a ground surface. This device can be used on any tire, whether that vehicle is stuck in sand, mud of holes in pavements. The device is designed to be portable and relatively lightweight so that all individuals can use the device. The device can be used on passenger vehicles and tractor trailers. While the device is relatively lightweight and is meant to be portable, it must be made from material that can withstand enormous forces in all environmental extremes. While the device can be used with any type of vehicle, for purposes of the patent application, the use of the device with a tractor trailer will be discussed.

Tractor trailers are commonplace on the highways and are often used to transport containers, which are either empty or full of goods; the combination of tractor trailer cab and attached tractor trailer can be in excess of 40,000 pounds. As you might expect it is important that the tractor trailer remains in motion most of the day. If the truck is idle the shipper is losing the opportunity to transport goods and lose money and the driver is also not earning any money. These tractor trailers are extremely heavy and they are commonly used in and around ports of railyards. Unfortunately, the road surfaces at ports and railyards will often have potholes of other "soft" spots due to the wear and tear on the road surface that is caused by the tractor trailer cab and attached load. If any part of the tractor trailer gets stuck in a pothole or other soft spot, the owner of the truck must call a towing service. The call to a towing service will result in more down time for the truck and additional costs and loss of revenue for the driver or owner.

Figure 1:
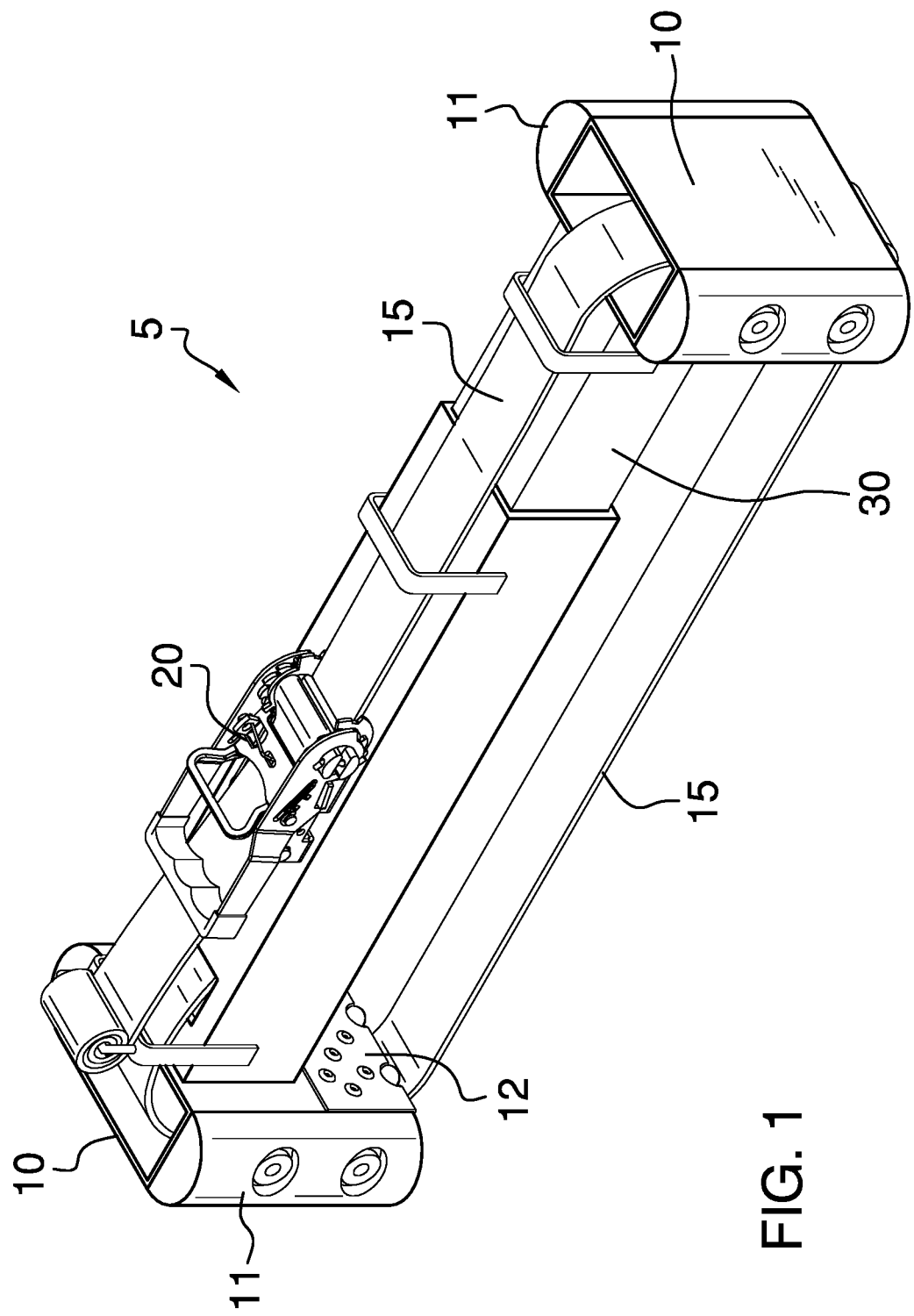
FIG. 1 is an isometric view of the device.
Figure 2:
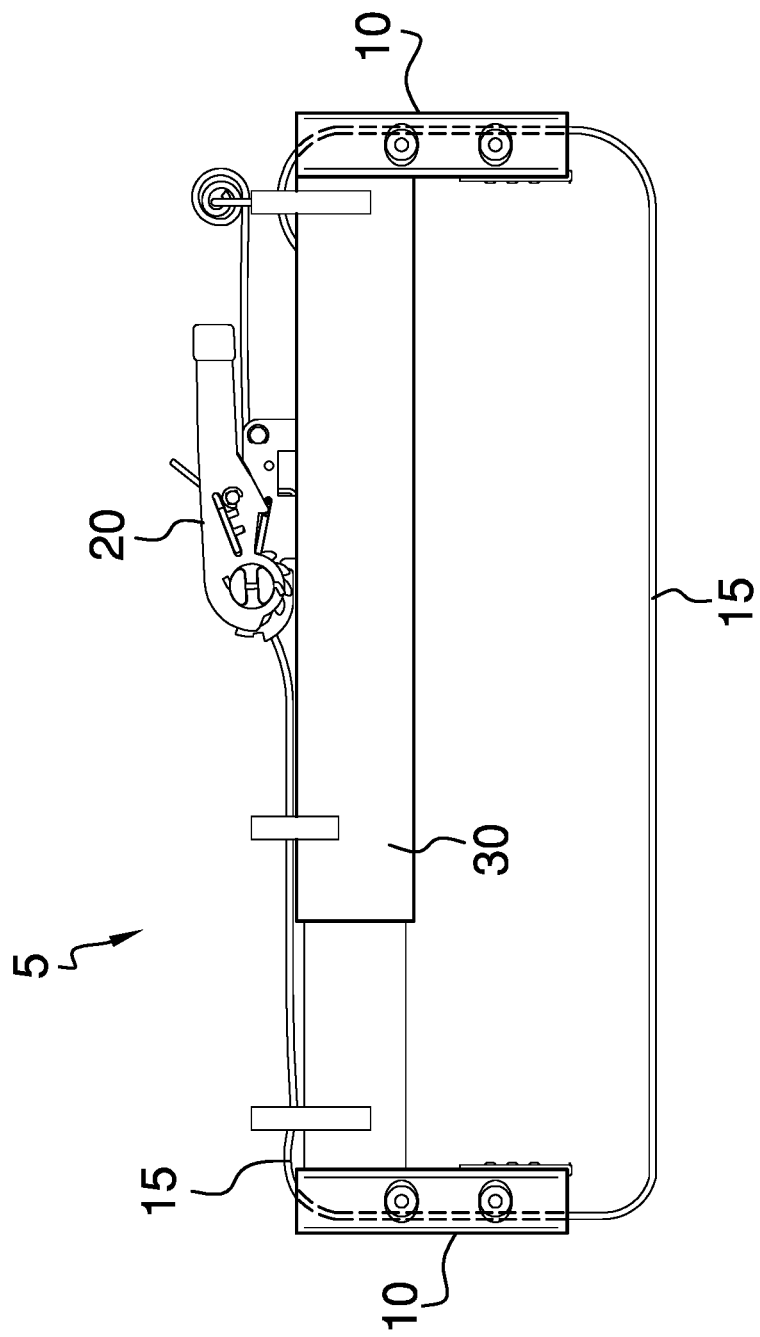
FIG. 2 is a side view of the device.
Figure 4:
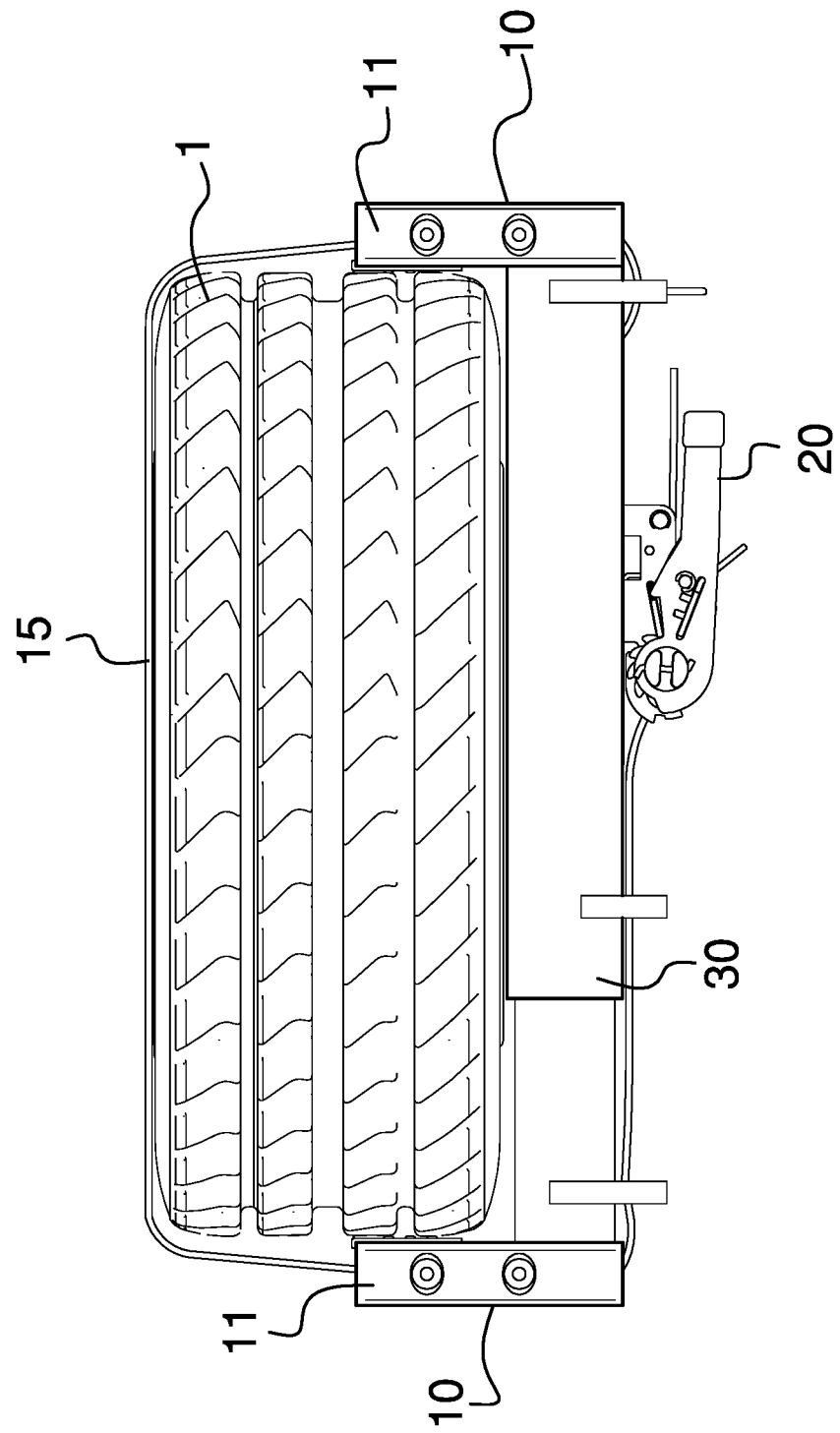
FIG. 4 is a top view of the device.

In the event a tire of the tractor trailer gets stuck, the driver can wrap this device 5 around the tire 1 of the tractor trailer such as depicted in FIG. 4. The device which is depicted in FIG. 1 has a pair of shoes 10 on opposite ends of the device. The shoes, which are hollow are connected by a rigid member 30; the rigid member may telescope to accommodate any sized tire. A band 15 will loop through the hollow portion of the shoes 10 and wrap completely around the tire surface as depicted in FIG. 4. A rounded surface 11 is placed on the sides of the shoes so that when the tire is rotated it will enable traction for the device and tire on the ground surface.

Figure 3:
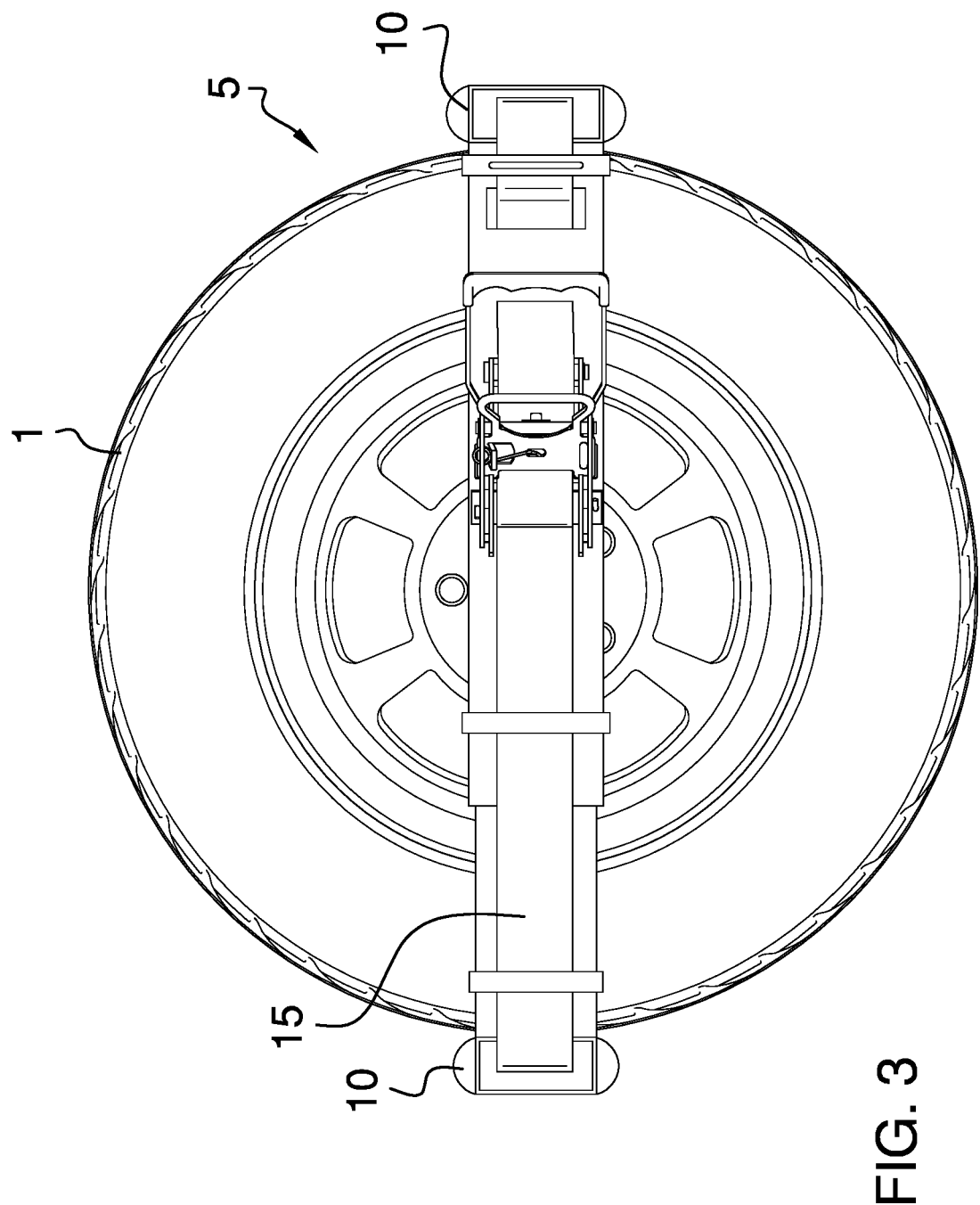
FIG. 3 is a front view of the device in use.

The user of the device 5 will place the device around the tire such as depicted in FIG. 3 tighten the band 15 around the tire 1 using the tightening means 20. There are many ways to tighten and a ratchet assembly or pulley assembly may be used. Regardless of the type of tightening means that is used, the tightening means must be usable by all persons regardless of the person's physical strength. There are many ways to tighten a band and no specific means is being claimed with this application. In order to ensure that the shoes remain on the tire surface a non-skid plate 12 is placed on the interior of the shoes and contact the tire surface when the device is in use.

The user places the device on the tire such as depicted in FIGS. 3 and 4. As the driver of the vehicle rotates the tire the rounded surface 11 contacts the ground and the truck or tractor trailer can move forward and be freed from the soft spot or pothole. Once the driver knows that the truck has moved past the dangerous spot the driver removes the device from the tire by loosening the device and stowing it in the truck.

The inventor claims:

1. A tire traction device, which is comprised of a pair of shoes
    wherein the pair of shoes are a predetermined shape;
    wherein the pair of shoes are positioned opposite from each other;
    wherein the pair of shoes are hollow;
    a rigid member;
    wherein the rigid member connects the pair of shoes;
    a non-skid surface;
    wherein the non-skid surface is placed on the interior surface of the pair of shoes;
    said non-skid surface contacts a truck tire when the device is in use;
    a plurality of rounded surfaces;
    wherein the plurality of rounded surfaces are placed on the exterior surfaces of the pair of shoes;
    a band;
    wherein the band is a predetermined shape;
    wherein the band connects the pair of shoes;
    said band passes through the hollow portion of the pair of shoes;
    a means to tighten
    wherein the means to tighten provides pressure on the pair of shoes on the outside of the tire.

2. The tire traction device as described in claim 1 wherein the means to tighten is a ratchet assembly.

3. The tire traction device as described in claim 1 wherein the rigid member telescopes.

\* \* \* \* \*